United States Patent
Parmentier et al.

(10) Patent No.: US 9,708,994 B2
(45) Date of Patent: Jul. 18, 2017

(54) METHOD OF REGENERATING AN EXHAUST AFTER TREATMENT DEVICE

(75) Inventors: Michael Parmentier, Chatillon (BE); Julien Schmitt, Kuntzig (FR)

(73) Assignee: DELPHI INTERNATIONAL OPERATIONS LUXEMBOURG S.A.R.L., Luxembourg (LU)

( * ) Notice: Subject to any disclaimer, the term of this patent is extended or adjusted under 35 U.S.C. 154(b) by 1051 days.

(21) Appl. No.: 12/710,533

(22) Filed: Feb. 23, 2010

(65) Prior Publication Data

US 2010/0212298 A1 Aug. 26, 2010

(30) Foreign Application Priority Data

Feb. 26, 2009 (EP) .................................. 09153751

(51) Int. Cl.
*F02D 41/02* (2006.01)
*F02D 41/40* (2006.01)

(52) U.S. Cl.
CPC ......... *F02D 41/029* (2013.01); *F02D 41/401* (2013.01); *F02D 41/402* (2013.01); *Y02T 10/44* (2013.01)

(58) Field of Classification Search
USPC .......... 60/274, 285, 286, 295, 297, 301, 311
See application file for complete search history.

(56) References Cited

U.S. PATENT DOCUMENTS

| | | | |
|---|---|---|---|
| 6,152,107 A | 11/2000 | Barnes et al. | |
| 7,140,345 B2* | 11/2006 | Gioannini et al. | 123/299 |
| 7,775,037 B2* | 8/2010 | Ishibashi | 60/287 |
| 2003/0140623 A1* | 7/2003 | Ootake | 60/297 |
| 2003/0145581 A1* | 8/2003 | Tashiro et al. | 60/286 |
| 2005/0060989 A1* | 3/2005 | Kawashima et al. | 60/295 |
| 2005/0252198 A1* | 11/2005 | Okugawa et al. | 60/284 |
| 2008/0078169 A1* | 4/2008 | Ishibashi | 60/287 |

FOREIGN PATENT DOCUMENTS

| | | |
|---|---|---|
| EP | 1132584 | 9/2001 |
| EP | 1363009 | 11/2003 |
| GB | 2340962 | 3/2000 |
| JP | 2002-261731 | 9/2002 |
| JP | 2002-266678 | 9/2002 |

(Continued)

OTHER PUBLICATIONS

European Search Report May 14, 2009.

(Continued)

*Primary Examiner* — Jorge Leon, Jr.
(74) *Attorney, Agent, or Firm* — Joshua M. Haines

(57) ABSTRACT

A method of controlling combustion in an internal combustion engine with exhaust after treatment device is proposed, wherein upon detection of a request for a regeneration event of the exhaust after treatment device, a regeneration combustion mode comprising a pilot injection and a retarded main injection is operated. During the regeneration combustion mode the injection timing of the main injection is controlled so that its retard is not later than a retard threshold that is determined as the maximum timing retard to provide the desired torque, but with an injected fuel quantity not exceeding a maximum fuel quantity given by a stored smoke-limit map.

6 Claims, 2 Drawing Sheets

(56) References Cited

FOREIGN PATENT DOCUMENTS

| JP | 2006-17073 | 1/2006 |
|----|------------|--------|
| JP | 2008-267287 | 11/2008 |
| WO | 02/066813 | 8/2002 |

OTHER PUBLICATIONS

Japan Office Action dated Aug. 3, 2011.
Japan Office Action dated May 2, 2012.
English Translation of 3rd Japan Office Action dated May 7, 2013.

\* cited by examiner

METHOD OF REGENERATING AN EXHAUST AFTER TREATMENT DEVICE

FIELD OF THE INVENTION

The present invention generally relates to the field of internal combustion engines, and namely to the regeneration of exhaust after treatment devices used e.g. in diesel engine exhaust lines for depollution purposes.

BACKGROUND OF THE INVENTION

The exhaust lines of engine motor vehicles of recent design are equipped with an exhaust after treatment device such as a particulate filter or a NOx trap to reduce their emissions of solid pollutants such as nitrogen oxides (NOx) and sulfur oxides (SOx), the exhaust after treatment device being intended to store such pollutants.

An exhaust after treatment device such as e.g. a diesel particulate filter (DPF) does not have an unlimited storage capacity, and the collected soot must be eliminated periodically and/or regularly to prevent e.g. the particulate filter (PF) from becoming clogged and to return it to its nominal efficiency. Moreover, clogging of the PF gradually creates a back-pressure that degrades the operation of the engine. This elimination of soot, referred to as "particulate filter regeneration", may be effected by heating the filter to a temperature higher than the combustion temperature of soot (which is normally around 550° C.) by means of the exhaust gases flowing therein.

In a standard manner, the engine-out exhaust gas temperature can be increased for the purpose of PF regeneration by using a regeneration specific fuel injection pattern. In such injection pattern, the execution timing of the main fuel injection is retarded later than compression stroke top dead centre (TDC), and is typically preceded by a pilot injection about TDC.

Additionally, an oxidation catalyst may be installed upstream of the PF, the oxidation catalyst being adapted to generate an exotherm upstream of the PF, which increases the temperature of the exhaust gases and thus assists in the regeneration. A post injection may thus be performed to increase the quantity of available hydrocarbons in the exhaust gases, the hydrocarbons being in turn converted by the oxidation catalyst through the exothermic reaction, heating the exhaust gases to a temperature above 550° C.

As it is well known, in the conventional engine control, the engine is mainly operated in a lean combustion mode, which is intended to achieve a desired engine power. In today's engines, in normal engine operation the combustion mode performs fuel injection in accordance with a pattern comprising one or two pilot injections followed by a main injection near a compression top dead centre (TDC). The energy, which is generated by combustion of the injected fuel, is converted into the engine power at high efficiency.

Then, when a need for regeneration of the DPF is determined, the combustion mode is switched to a regeneration specific combustion mode with retarded multiple injections to provide an increase in the temperature of the exhaust gases and assist in regeneration process of the DPF. A typical regeneration pattern comprises a significantly retarded main injection, preceded by one or two pilot injections after compression TDC. As compared to the normal combustion mode, the retarded, regeneration specific multi-injection pattern should achieve the same engine torque for a given engine speed and load condition with a concurrent increase in the amount of waste heat, which thus requires additional fuel.

Then, to further increase the amount of waste heat, the injection pattern in regeneration combustion mode may comprise a post-injection, after the main injection, to increase the amount of uncombusted HC in the exhaust gas and thereby generate an exotherm in the oxidation catalyst.

Accordingly, the control of engine combustion during a DPF regeneration event consists in finding adequate injection parameters, namely: number of injection events per cycle, injection timing, fuel quantities, to provide the desired torque and waste heat while taking into account emission levels and ensuring engine stability and driveability. In this last respect, the switch from normal combustion to regeneration-specific combustion mode should not sensibly alter the driveability of the vehicle.

OBJECT OF THE INVENTION

The object of the present invention is to provide an alternative method of providing assistance in regenerating an exhaust after treatment device. This object is achieved by a method as claimed in claim 1.

SUMMARY OF THE INVENTION

In the conventional approach of retarded, multi-injection combustion strategies performed to provide an increase in exhaust gas temperature to assist in the regeneration of a DPF, an important aspect to be taken into account for retarding the timing of the main injection and correspondingly increasing the fuel quantity is the air to fuel (A/F) ratio; indeed the injected fuel quantity should not be so large, respectively so rich, to cause smoking. Also, when operating with a given retard of main injection timing to provide an increased amount of waste heat, it should still be possible— for driveability reasons—to increase the injected fuel quantity in order to increase the torque in response to a torque demand by the driver. Therefore, in conventional multi-injection combustion operated for DPF regeneration, the control of the retard of the main injection is determined with respect to the injected fuel quantity, itself set to avoid generation of smoke and permit an acceleration by increasing the fuel quantity (still for the same retarded timing of the main injection—bearing in mind that the fuel injection timing is conventionally mapped as a function of load).

Accordingly, the timing retard is set to provide for a certain "fuel reserve", i.e. the possibility to increase the injected fuel quantity at a given retarded timing.

By contrast, the present invention proposes a method of controlling the combustion of an internal combustion engine with an exhaust gas after treatment device, wherein, upon detection of a need for a regeneration event, the combustion mode is operated in a retarded, regeneration combustion comprising retarded pilot and main injections (as compared to the normal combustion mode).

According to an important aspect of the present invention, during the retarded, regeneration combustion mode the injection timing of the main injection is controlled so that its (retarded) timing is not later than a retard threshold that is determined as the maximum possible retard to provide said torque demand, but with an injected fuel quantity not exceeding a maximum fuel quantity given by stored smoke-limit curves. As it is known, smoke-limit curves are calibrated to avoid smoke and depend on engine operating conditions such as speed, load, ambient conditions, etc.

Hence, when operating at a constant torque, injection timing retard and waste heat may be maximum, without smoke. If the driver presses the accelerator pedal, transient increase in torque demand will cause a reduction in the main injection retard, but the main injection will still be executed at a timing that comprises the greatest possible retard in consideration of the torque demand and of the smoke limit.

So not only does the present retard threshold form a timing limit for the main injection timing, but main injection can advantageously be executed at the timing of the retard threshold in particular when there is a demand for increased torque.

In practice however, the retard threshold may advantageously be used together with one or more main timing map(s) depending on engine operating conditions that also take into account issues of combustion stability, fuel consumption, noise etc. In such case, the selected operating timing value for executing the main injection will however not be later than the retard threshold.

Preferred variants of the present method are described in the appended dependent claims.

In one embodiment, the injection pattern in the regeneration combustion mode comprises a post injection to generate an exotherm by reaction with oxidation catalyst means associated with the exhaust after treatment device, the post injection pulse being advantageously dependent on the main injection in terms of execution timing and/or fuel quantity.

BRIEF DESCRIPTION OF THE DRAWINGS

The present invention will now be described, by way of example, with reference to the accompanying drawings, in which.

DETAILED DESCRIPTION OF A PREFERRED EMBODIMENT

The method of the present invention is suited for operating the regeneration of an exhaust after treatment device in an exhaust line of an internal combustion engine, typically a diesel engine. As it is known in the art, such device may be a NOx trap or a diesel particulate filter (DPF) arranged in the exhaust stream to trap NOx and soot respectively.

In the case of a DPF for example, it may comprise a honeycomb structure of refractory ceramics as a filter substrate. Cells of the honeycomb structure, which form a gas flow passage, are configured to alternately form inlets and outlets. The exhaust gas, which is discharged from the engine cylinders, flows down through the porous partition walls of the DPF and the particulate matter (PM) is captured by and is accumulated on the partition walls.

Advantageously, catalyst means with an oxidation function are associated with the DPF to allow an intentional increase in the exhaust gas temperature by an exothermal oxidation reaction, in order to assist in the DPF regeneration process. The catalyst means may take the form of a separate direct oxidation catalyst (DOC) placed in front (upstream) of the DPF. Alternatively, oxidation catalyst material may be coated on the walls of the cells of the DPF. Such catalyst means are well known in the art and will not be further discussed herein.

Figure 3:
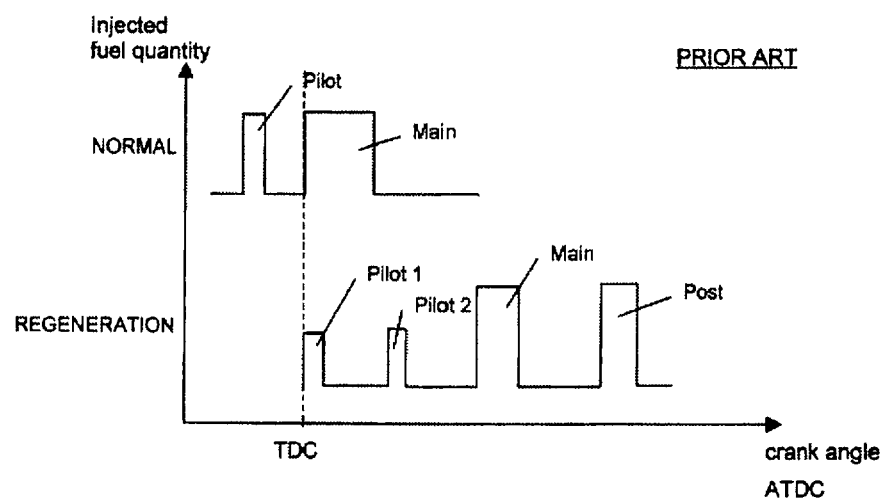
FIG. 3: is a timing chart showing injection patterns conventionally used for normal combustion and DPF regeneration.

In a standard manner, a diesel engine is operated, most of the time, in the combustion mode illustrated in FIG. 3. In this normal combustion mode the injection pattern is intended to achieve a desired engine power; the injection pattern (indicated NORMAL in FIG. 3) consists of injection events near compression stroke top dead center (CTDC). The energy, which is generated by combustion of the injected fuel, is converted into the engine power at high efficiency.

FIG. 3 also shows a typical multi-injection pattern that is operated when a need for a regeneration event is determined, indicated REGENERATION. The fuel is injected in multiple injection stages, starting from the point near CTDC on the retarded side and here comprises two pilot injections, followed by a main injection and a post injection. The pilot and main injections are intended to apply thermal energy to the exhaust gas while achieving the desired engine power. The post-injection permits increasing the amount of unburned HC in the exhaust gases to generate an exotherm in the oxidation catalyst. Depending on its injection timing, a post injection can also be used to higher the exhaust gas temperature.

As it is well known, the engine control is conventionally performed by an electronic control unit (ECU) that receives signals from various sensors reflecting the engine status and comprises stored maps to determine appropriate control parameters depending on engine operating conditions. Preferably, the determination of the need for regeneration of the DPF and selection of an appropriate injection pattern is also performed by the ECU.

In this connection and in a manner known per se, a differential pressure sensor for sensing a pressure difference between the upstream side and downstream side of the DPF may be provided to determine the amount of accumulated PM, which is accumulated on the DPF. This information is fed to the ECU and may serve as a basis for determining whether a regeneration event is required. Alternatively, a need for a regeneration event may be indicated manually to the ECU by the driver by depressing a button on the dashboard.

A preferred multi-injection combustion pattern for a regeneration event as may be performed when a need for regeneration is determined or requested will now be described with reference to FIG. 1. The present regeneration combustion pattern comprises (pulses in light grey): one pilot injection near CTDC on the retarded side; preferably a second pilot injection; a retarded main injection; and a subsequent post-injection.

As it is known in the art, the pilot(s) and main injections are intended to provide a heat increase in the exhaust gases, while achieving the desired engine power. The post-injection serves to increase the amount of unburned HC in the exhaust gases.

It shall be appreciated that, in the present regeneration combustion mode, the timing retard of the main injection is controlled in such a way that the operating timing of the main injection (i.e. the timing at which the main injection is actually executed) is not later than a retard threshold determined as the maximum possible timing to provide the desired torque, but with an injected fuel quantity not exceeding a maximum fuel quantity given by stored smoke-limit curves. Accordingly, while for the desired torque the fuel quantity is increased to allow for a retarded main injection providing an increased ratio of waste heat, the fuel quantity, and thus the corresponding retarded timing, is however limited by the maximum fuel quantity as given by the stored smoke-limit maps.

Such smoke-limit maps are known in the art and conventionally used with turbocharged diesel engines. They consist of calibrated curves that give for a particular engine at different conditions a not to exceed A/F ratio in order to avoid smoke.

While the retard threshold is determined especially to achieve high exhaust gas temperatures, the main injection timing control may also employ timing maps that are elaborated to take into account other issues such as stability of combustion, fuel consumption, driveability, noise, etc. In such case where one or more main injection timing maps are used during the regeneration combustion mode, theses timings will be compared to the retard threshold and the selected operating timing of the main injection (i.e. timing at which it is actually performed) will not be later than the retard threshold.

Figure 2:
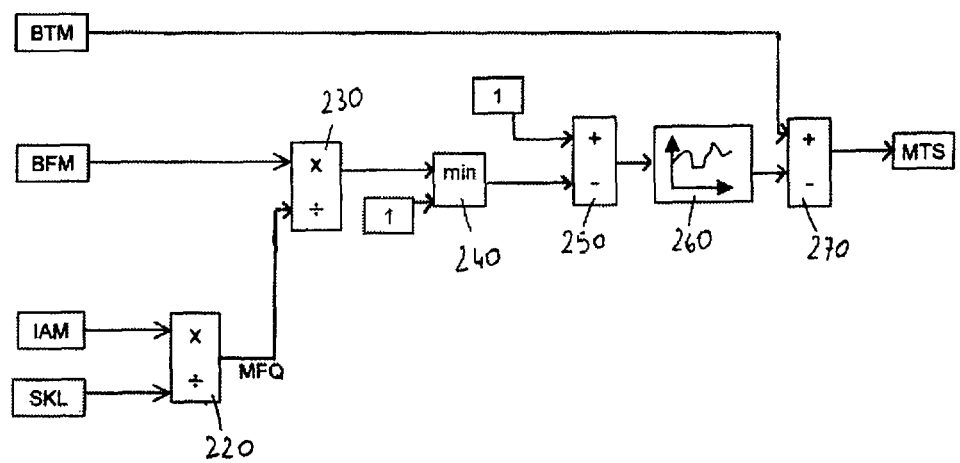
FIG. 2: is a flow chart illustrating the determination of the retard threshold for the main injection timing.

A preferred strategy for calculating the retard threshold limiting the retarded main injection in accordance with the present regeneration combustion mode is illustrated in FIG. 2. Reference sign BTM corresponds to the injection timing providing the best torque (lowest waste heat) while reference sign BFM represents the injected fuel quantity required to provide the demanded torque with the optimum timing BTM. BTM may typically be a stored value depending mainly on engine speed and load as well as EGR rate or coolant, that provides the most efficient combustion. i.e. with minimum waste heat. BFM is calculated based on the desired driver torque.

Figure 1:
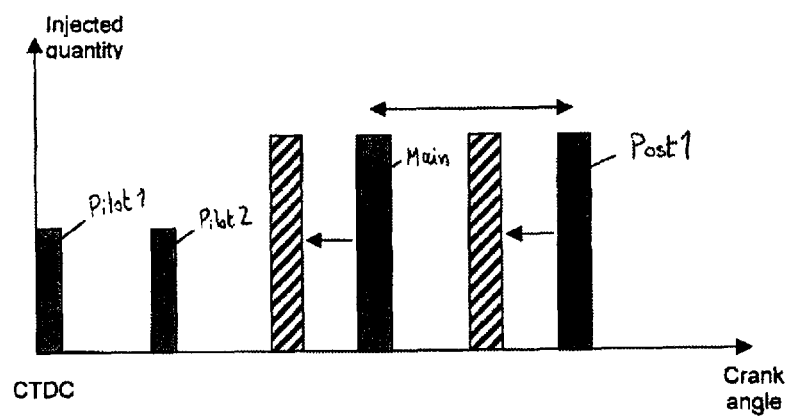
FIG. 1: is a timing chart showing injection patterns performed in the present regeneration combustion mode.

As can be understood from the Fig., in the present embodiment the best main injection timing BTM is corrected by a value that is determined as described hereafter, to form the retard threshold MTS that is actually used as maximum retard limit for the retarded main injection in the multi-injection, regeneration combustion pattern of FIG. 1. Reference sign SKL indicates the limit air-to-fuel ratio that shall not be exceeded for the current engine operating conditions to avoid smoke (as obtained by a stored smoke-limit map). In Box 220 the intake air mass IAM, conventionally measured in the intake line, is divided by the A/F ratio SKL to give the maximum fuel quantity MFQ. Next at 230 the ratio BFM to MFQ is calculated; this ratio is then compared to 1 to keep the minimum of these two values, box 240. The output of box 240 is the lowest acceptable efficiency, for a smoke limited injection (efficiency at BTM being 1). The output of box 240 is then subtracted from 1, to convert from efficiency to efficiency loss (efficiency loss at BTM being 0), and the resulting value is entered into box 260 that includes efficiency loss curves. The efficiency loss curves in box 260 are calibrated to output a timing retard corresponding to the input efficiency loss ratio of box 250. Finally, the retard threshold MTS of the main injection is computed in box 270 as the difference between BTM and the output value of box 260. Hence the output value of box 260 gives a relative retard value with respect to the BTM timing and not to the top dead centre, but MTS is the final maximum allowable retard for the main injection timing.

In case the maximum fuel quantity MFQ is equal to or less than the optimal fuel mass BFM, the fuel ratio of box 230 is greater than 1, whereby the BTM timing is not altered and MTS thus equal BTM.

However, if it is determined that for a given operating point the ideal fuel quantity BFM is smaller than the maximum fuel quantity in view of the smoke limit, then the lowest acceptable efficiency is less than one, say e.g. 0.9. In such a case, the output of box 250 is 0.1 and a relative retard is looked-up in table 260 for a total amount of fuel corresponding to the maximum fuel quantity MFQ.

Operating at the smoke limit is not problematic when the torque demand is constant (or decreases), but if there is an increase in torque demand, no additional fuel can be injected. This is why in conventional methods a fuel margin is observed with respect to the smoke limit.

However in the present method, the timing of the main injection is advantageously determined as the latest possible timing to provide the desired torque, with a fuel quantity in accordance with the smoke limit. This means that upon a request for more torque, the fuel quantity will not be increased for the same main injection timing, but the retard of the main injection timing will be reduced to, in accordance with the present invention, the latest possible timing to provide the required torque.

Turning back to FIG. 1, it shall be noted that in the present method, the post-injection pulse is advantageously calculated as a calibratable fraction of the main injection pulse, whereby both timing and fuel quantity are dependent on the main injection pulse. The advantage to specify the post-injection pulse as a fraction of the main pulse is that if the main quantity changes, the post 1 is always calculated for the best engine-out temperature. Assuming that, with reference to FIG. 1, current injection timings are that represented by the light grey pulses, in case of a demand for increased torque during regeneration, the retard of the main injection timing will have to be reduced in accordance with the present method, and the main pulse thus moves to the left as illustrated by the arrow and to have an earlier main pulse (striped). The corresponding post pulse is also executed earlier, since it depends on the main, whereby a same or similar time spacing is easily kept between main and post.

The invention claimed is:

1. A method of controlling combustion in an internal combustion engine with exhaust after treatment device, wherein upon detection of a request for a regeneration event of said exhaust after treatment device, a regeneration combustion mode comprising a pilot injection and a retarded main injection is operated, the method comprising the steps of:
   determining a desired torque to be produced by the engine;
   determining a maximum injected fuel quantity given by a stored smoke-limit map;
   determining a retard threshold as a maximum timing retard of the start of the main injection that will provide the desired torque without exceeding the maximum injected fuel quantity given by the stored smoke-limit map; and
   controlling the timing of the start of said main injection so that its retard is later than an injection timing that provides the best torque with the greatest efficiency and is not later than the retard threshold to provide the desired torque, while controlling an injected fuel quantity to provide the desired torque and to not exceed the maximum injected fuel quantity given by the stored smoke-limit map.

2. The method according to claim 1, wherein the main injection is started at said retard threshold.

3. The method according to claim 1, wherein combustion is controlled during said regeneration combustion mode on the basis of at least one main timing map and said retard threshold, the timing of the start of said main injection being no later than said retard threshold.

4. The method according to claim 1, further comprising the step of determining an intake air amount to the engine, wherein the maximum fuel quantity is determined from the actual intake air amount.

5. The method according to claim 1, wherein said exhaust after treatment device comprises oxidation catalyst means and the regeneration combustion mode comprises a post injection of a post-injection quantity of fuel that is executed after said main injection, wherein the post-injection quantity of fuel is a predetermined calibratable non-zero fraction of the fuel quantity of the main injection.

6. The method according to claim 5, wherein the timing of the start of said post injection is dependent on the timing of the start of said main injection.

* * * * *